United States Patent
Timon et al.

(10) Patent No.: US 6,257,541 B1
(45) Date of Patent: Jul. 10, 2001

(54) SLIDE FOR VEHICLE SEAT, AND SEAT INCLUDING SUCH SLIDE

(75) Inventors: Michel Timon, Fleury sur Orne; Pierre Moradell Casellas, St Georges des Groseillers, both of (FR)

(73) Assignee: Bertrand Faure Equipements SA, Boulogne (FR)

( * ) Notice: Subject to any disclaimer, the term of this patent is extended or adjusted under 35 U.S.C. 154(b) by 0 days.

(21) Appl. No.: 09/298,633

(22) Filed: Apr. 23, 1999

(30) Foreign Application Priority Data

Apr. 23, 1998 (FR) .................................................. 98 05092

(51) Int. Cl.$^7$ ................................................ A47G 29/02
(52) U.S. Cl. ........................................... 248/429; 248/424
(58) Field of Search ................................... 248/424, 429, 248/430; 297/341, 344.1

(56) References Cited

U.S. PATENT DOCUMENTS

| 5,020,853 | 6/1991 | Babbs | 297/341 |
|---|---|---|---|
| 5,216,936 | 6/1993 | Baloche | 74/527 |
| 5,597,206 | * 1/1997 | Ainsworth et al. | 297/378.12 |
| 5,611,599 | 3/1997 | Baloche et al. | 297/367 |
| 5,688,026 | 11/1997 | Reubeuze et al. | 297/341 |
| 5,769,494 | 6/1998 | Barrere et al. | 297/367 |
| 5,779,313 | 7/1998 | Rohee | 297/367 |
| 5,855,413 | * 1/1999 | Couasnon et al. | 297/341 |
| 6,098,946 | * 8/2000 | Sechet et al. | 248/424 |
| 6,102,478 | * 8/2000 | Christopher | 297/341 |

FOREIGN PATENT DOCUMENTS

| 690 17 972 | 7/1995 | (DE) . |
|---|---|---|
| 2 494 574 | 5/1983 | (EP) . |
| 0 502 774 | 9/1992 | (EP) . |
| 0 642 946 | 3/1995 | (EP) . |
| 0 694 434 | 1/1996 | (EP) . |
| 0 723 889 | 7/1996 | (EP) . |
| 0 769 409 | 4/1997 | (EP) . |
| 0 770 514 | 5/1997 | (EP) . |
| 2 759 330 | 8/1998 | (FR) . |
| 419159 | 9/1933 | (GB) . |
| 2 234 431 | 2/1991 | (GB) . |
| WO 97/03861 | 2/1997 | (WO) . |

OTHER PUBLICATIONS

French Preliminary Search Report dated Jan. 5, 1999, Int'l Appl. No. FR 9805092.

French Preliminary Search Report dated Jan. 6, 1999, Int'l. Appl. No. FR 9805235.

* cited by examiner

Primary Examiner—Anita M. King
Assistant Examiner—Gwendolyn Baxter
(74) Attorney, Agent, or Firm—Marshall, O'Toole, Gerstein, Murray & Borun (57) ABSTRACT

A vehicle seat slide includes a fixed section, a mobile section, a memory shoe sliding along the fixed section and defining a memorized position of the mobile section, a first actuator which simultaneously unlocks the slide and fastens the shoe to the mobile section, and a second actuator which unlocks only the slide. The second actuator operates a fastener device of the shoe via a cable.

7 Claims, 5 Drawing Sheets

SLIDE FOR VEHICLE SEAT, AND SEAT INCLUDING SUCH SLIDE

FIELD OF THE INVENTION

The present invention concerns slides for vehicle seats and seats including such slides.

The invention is more particularly concerned with a vehicle seat slide including:

- a fixed section adapted to be attached to the floor of the vehicle,
- a mobile section mounted to slide along the fixed section and adapted to be attached to the squab of the seat to enable the squab to move forward and backward in a longitudinal direction,
- a slide lock mounted on the mobile section and movable between a locked position in which said slide lock co-operates with the fixed section to immobilize the mobile section and an unlocked position in which said slide lock does not co-operate with the fixed section and allows said mobile section to slide, the slide lock being spring-loaded towards its locked position,
- a memory shoe mounted to slide relative to the fixed section parallel to the longitudinal direction, the memory shoe defining a memorized position of the mobile section,
- a shoe fastener device mounted on the mobile section and mobile between a coupled position in which said fastener device fastens the memory shoe to the mobile section and a decoupled position in which said fastener device does not fasten the memory shoe to the mobile section,
- a first actuator device mechanically connected to the slide lock and adapted to place the slide in a first unlocked state in which the slide lock is in its unlocked position and the fastener device is in its coupled position to enable simultaneous sliding of the mobile section and the memory shoe relative to the fixed section, either forward or backward, to adjust the memorized position of the seat, and
- a second actuator device mechanically connected to the slide lock and adapted to place the slide in a second unlocked state, in which the slide lock is in its unlocked position and the fastener device is in its decoupled position, to enable the mobile section to slide forward without the memory shoe moving, the memory shoe then limiting backward movement of the mobile section.

BACKGROUND OF THE INVENTION

Document EP-A-0 723 889 describes one example of a slide of the above kind.

In prior art slides of this type the slide lock co-operates with the fastener device either when the first actuator device is operated or when the second actuator device is operated.

This co-operation makes slides of the kind in question relatively complex and limits the possible configurations of such slides because the fastener device and the memory shoe must be in the immediate vicinity of the slide lock.

OBJECT AND SUMMARY OF THE INVENTION

One aim of the present invention is to alleviate these drawbacks.

To this end, a slide of the kind in question and in accordance with the invention is essentially characterised in that the first or second actuator device further includes a cable transmission device, called the fastener actuator cable system, which is connected to the fastener device to actuate the fastener device, and the slide lock does not co-operate with the fastener device.

The slide lock and the fastener device can then be operated simultaneously without any direct mechanical co-operation between the fastener device and the slide lock.

This limits the complexity of the slide and makes the locations of the slide lock and the fastener device independent of each other, the cable being able to follow a relatively long and sinuous path to the fastener device if necessary.

Preferred embodiments of the invention can have any of the following features:

- the first actuator device includes a first actuator member mobile between a rest position and an actuation position corresponding to unlocking of the slide lock, the second actuator device includes a second actuator member mobile parallel to the first actuator member between a rest position and an actuation position corresponding to unlocking of the slide lock, the first or second actuator member, referred to hereinafter as fastener actuator members, is connected to the fastener actuator cable system, and the other actuator member is disposed so that movement of the fastener actuator member from its rest position to its actuation position moves said other actuator member from its rest position to its actuation position and movement of said other actuator member from its rest position to its actuation position does not move the fastener actuator member;
- the fastener device is spring-loaded toward its decoupled position and the fastener actuator cable system is connected to the first actuator member to move the fastener device into its coupled position when said first actuator member is moved from its rest position to its actuation position;
- the memory shoe includes a shoe lock mobile between a locked position in which said shoe lock co-operates with the fixed section to immobilize the memory shoe relative to said fixed section and an unlocked position in which said shoe lock does not co-operate with the fixed section but co-operates with the mobile section to fasten the memory shoe to said mobile section, the shoe lock is spring-loaded towards its locked position, so that said shoe lock is part of the fastener device, and the fastener device further includes an actuator member which is operated by the fastener actuator cable system and which co-operates with the shoe lock to move said shoe lock into its unlocked position on operation of the first actuator device;
- the actuator member which is part of the fastener device takes the form of a lever mounted to pivot on the mobile section about a vertical axis, the lever includes a vertical actuator finger disposed laterally relative to the slide and adapted to act on the shoe lock and the memory shoe is also disposed laterally relative to the slide;
- the mobile section is attached to a lug that covers the memory shoe at least partly when said mobile section is in its memorized position and the lug is shaped to co-operate with at least one part of the shoe lock when said shoe lock is in the unlocked position so that the memory shoe is then fastened to the mobile section.

The invention further consists in a seat including a squab carried by at least one slide as defined hereinabove.

This slide, referred to as a memory slide, is preferably associated with an additional slide comprising:

a fixed section extending in said longitudinal direction, a mobile section mounted to slide along the fixed section and attached to the squab of the seat, and a slide lock mounted on the mobile section and mobile between a locked position in which said slide lock co-operates with the fixed section of the additional slide to immobilize the mobile section of that slide and an unlocked position in which said slide lock does not co-operate with the fixed section of the additional slide and allows said mobile section of that slide to slide, the slide lock of the additional slide being spring-loaded toward its locked position, wherein the slide locks of the memory slide and the additional slide are operated by respective parallel first and second rigid links extending transversely relative to the slides, the first link is attached to the second actuator member and mounted to slide relative to the first actuator member and the second link is mounted to slide relative to the first and second actuator members, the first and second actuator devices comprise respective first and second lock actuator cable systems which each include a flexible outer sheath and a flexible inner cable, the outer sheaths of the first and second lock actuator cable systems are attached to a common rigid block mounted to slide relative to the first link and attached to the second link, the inner cables of the first and second lock actuator cable systems are mounted to slide relative to said rigid block, the second actuator member is disposed between the first actuator member and the rigid block, said rigid block is disposed toward the memory slide, and at least one compression spring is disposed between said rigid block and the second actuator member, the fastener actuator cable system includes a flexible outer sheath fixed to the first actuator member and a flexible inner cable which slides in the first actuator member and in a guide attached to the second link, this guide is disposed between the first actuator member and the additional slide, and the inner cable of the fastener actuator cable system has a rigid head that is normally situated at a particular non-zero distance d from said guide, between the guide and the additional slide, if the first and second actuator devices are not operated, the rest and actuation positions of the first actuator member are separated by a distance greater than d/2 and the rest and actuation positions of the second actuator member are separated by a distance at most equal to d.

BRIEF DESCRIPTION OF THE DRAWINGS

Other features and advantages of the invention will become apparent in the course of the following description of one embodiment of the invention given by way of non-limiting example and with reference to the accompanying drawings.

In the drawings.

MORE DETAILED DESCRIPTION

The same reference numbers designate identical or similar components in the various figures.

Figures 1, 2:
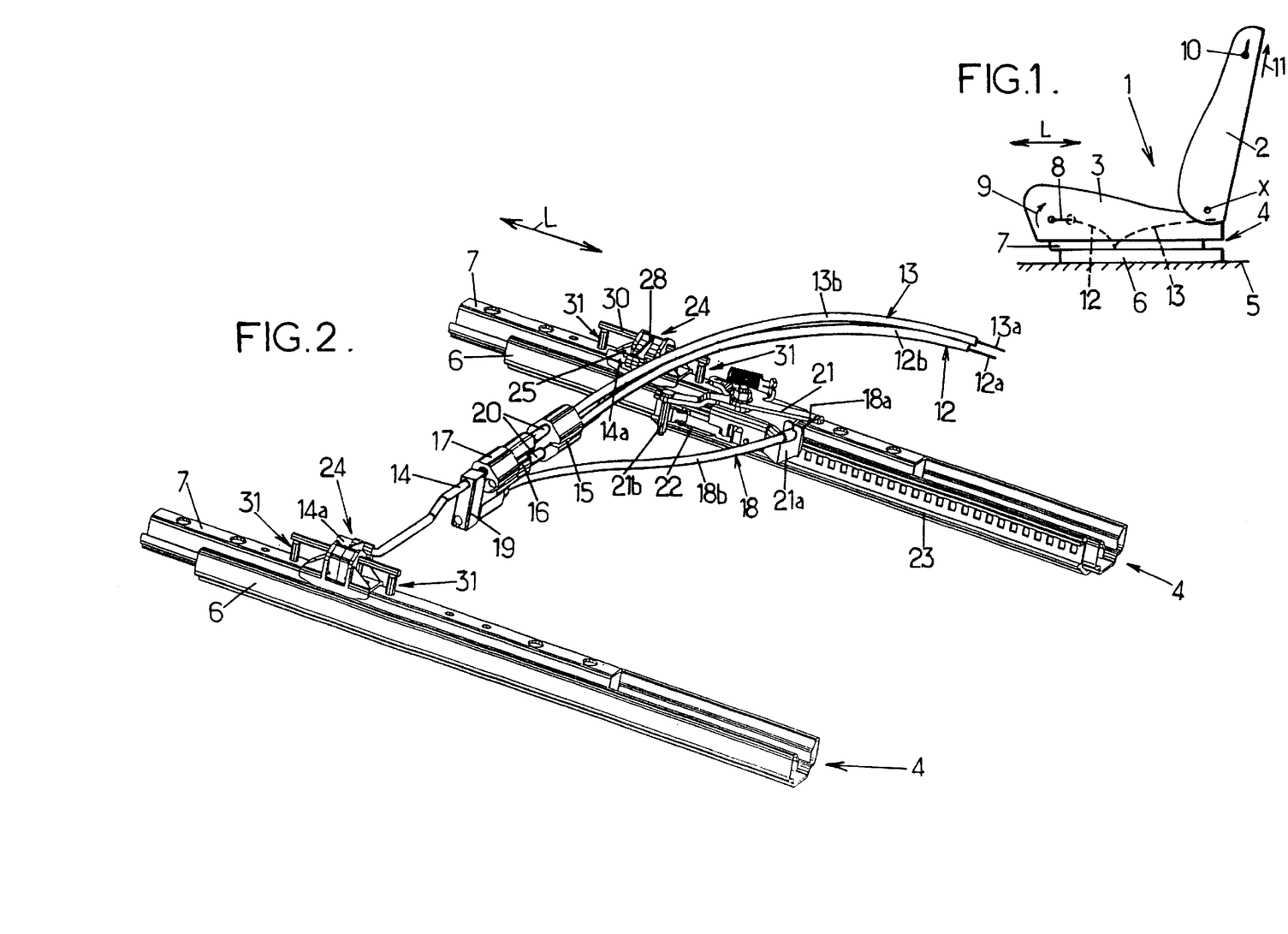
FIG. 1 is a diagrammatic view of a seat having a squab mounted on slides constituting one embodiment of the invention.
FIG. 2 is a perspective view showing the slides of the seat from FIG. 1.

FIG. 1 shows a vehicle seat 1, in particular a motor vehicle front seat, which includes a seat back 2 mounted on a seat squab 3 to pivot about a transverse horizontal axis X. The squab is supported by two parallel slides 4 fixed to the floor 5 of the vehicle.

Each slide 4 includes a fixed section 6 attached to the floor 5 of the vehicle and a mobile section 7 attached to the squab of the seat and which slides along the fixed profile in a longitudinal direction L.

Each slide 4 is normally locked in position, as explained below, and the two slides can be simultaneously unlocked by moving a handle 8 in the direction of the arrow 9 to enable the longitudinal position of the seat 1 to be adjusted.

In the example under consideration, the seat 1 further includes a handle 10 which can be moved in the direction of the arrow 11 to enable the seat back 2 to fold forward and the seat squab 3 to slide forward, in particular to enable a user of the vehicle to access the space behind the seat 1 if it is a front seat of a two-door motor vehicle.

Moving the handle 8 and folding the seatback 2 forward apply traction to respective sheathed cables seen clearly in FIG. 2, namely:

a cable 12a for adjusting the longitudinal position of the seat, forming part of a cable transmission device 12 or actuator cable system operated by the handle 8, and a cable 13a for access to the rear seats forming part of a cable transmission device 13 or actuator cable system operated by folding the seat back 2.

Figure 3:
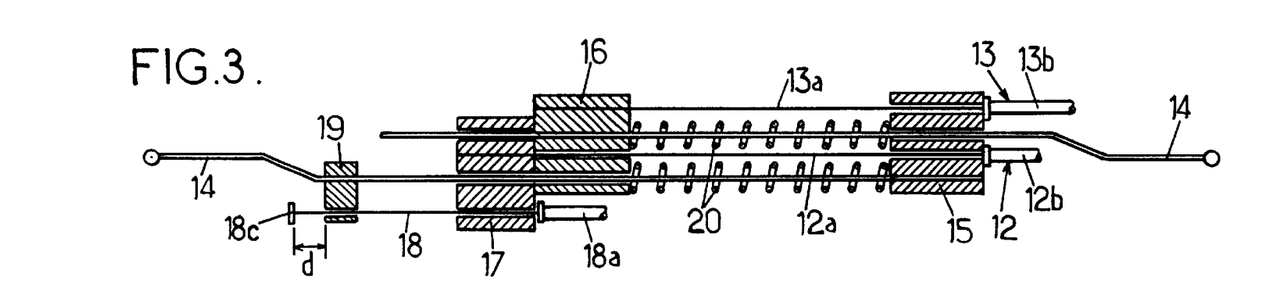
FIG. 3 is a diagrammatic sectional view of the actuator device for unlocking the slides from FIG. 2, shown in an unoperated position.

The two cables 12a, 13a operate an actuator device seen clearly in FIGS. 2 and 3 and including:

two rigid horizontal links 14 extending transversely between the two slides 4, a first rigid block 15 attached to the sheaths 12b, 13b of the cables 12a, 13a, the first block being also attached to one of the links 14, and the other link 14 and the two cables 12a, 13a sliding through it, a second rigid block 16 attached to the cable 13a and to the link 14 which slides in the first block 15, the cable 12a and the link 14 attached to the first block 15 sliding through the second block 16, a third rigid block 17 which is attached to the cable 12a and through which the two links 14 slide, the third block being also attached to the sheath 18b of a cable 18a of a cable transmission device 18 or actuator cable system, the cable 18 sliding through the third block 17 and the third block 17 being disposed against the second block 16, opposite the first block 15, a fourth rigid block 19 attached to the link 14 which is attached to the first block 15, the cable 18a sliding through the fourth block 19 and terminating in an enlarged head 18c which is normally at a particular non-zero distance d from the fourth block 19, the fourth block 19 being disposed between the third block 17 and one of the slides 4, opposite the first and second blocks, and two springs 20 disposed between the first and second blocks 15, 16 and urging them apart.

As shown in FIG. 2, the cable 18a is also connected to a link 21 that pivots about a vertical axis on the mobile section 7 of one of the slides and the sheath 18b of the cable 18a is also fixed to a rigid support 21a attached to said mobile profile 7.

The link 21 is attached to a vertical actuator finger 21b disposed laterally relative to the slide 4 concerned, facing a memory shoe 22 mounted to slide in the longitudinal direction L along a rule 23 fixed laterally to the fixed profile 6 of the slide 4 in question.

Each of the two links 14 of the actuator device terminates at a right-angled end 14a which extends in the longitudinal direction L and which entrains an operating device 24 mounted on the mobile section 7 of the corresponding slide.

Figure 4:
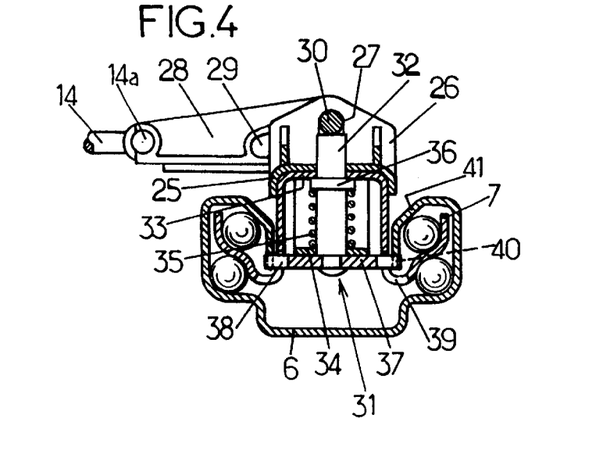
FIG. 4 is a view in cross-section of one of the slides from FIG. 2, shown in an unoperated position.
Figure 6:
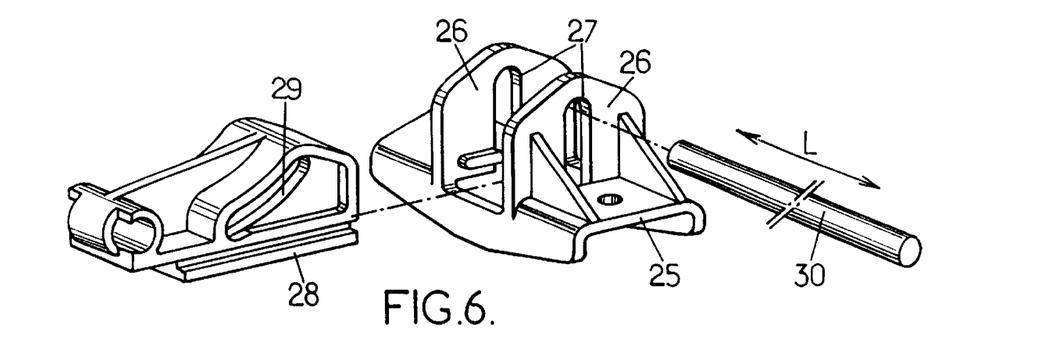
FIG. 6 is an exploded perspective view showing the mechanism for operating the locks of the slide from FIG. 4.

As shown in FIGS. 4 and 6, the operating device 24 includes:

a guide 25, which can be made of a plastics material, for example, and which is attached to the mobile profile 7 of the slide, the guide 25 including two parallel vertical flanges 26 extending transversely to the longitudinal direction L, the two flanges 26 including two respective vertical slots 27 aligned with each other in the longitudinal direction L, a slide 28, which can be made of a plastics material, for example, and which is mounted to slide in the guide 25, between the two flanges 26, so that it can move only transversely, the slide 28 having a slot 29 extending across it obliquely to the horizontal in a transverse vertical plane and the slide 28 being pivotally attached to the right-angled end 14a of one of the links 14, and a rigid actuator rod 30, which can be made of metal, for example, and which extends in the longitudinal direction and passes through the two slots 27 and the slot 29.

The inclined slot 29 of the slide is inclined upward in the direction away from the corresponding link 14 and the link 14 is urged elastically by the springs 20 towards the space between the two slides 4, so that in the unoperated position the actuator rod 30 is in a raised position, as shown in FIG. 4.

In this position the actuator rod 30 does not interfere with the slide locks 31, of which there are two on each slide (see FIG. 2).

Figure 5:
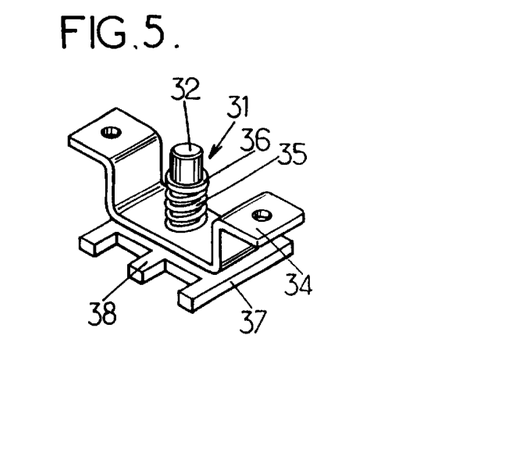
FIG. 5 is a perspective detail view of one of the locks of the slide from FIG. 4.

As shown in detail in FIGS. 4 and 5, each lock 31 is a metal component which includes:

a vertical rod 32 which slides through the top web 33 of the mobile section 7 of the corresponding slide and a support bracket 34 fixed to the bottom of said top web, a coil spring 35 being mounted between the bracket 34 and a flange 36 on the rod 32 to urge said rod upward, and a horizontal bottom plate 37 which has lateral teeth 38 extending in the transverse direction and passing through openings 39 in the mobile section 7 to engage with complementary teeth 40 at the bottom end of a re-entrant rim 41 of the fixed section 6 on either side of the mobile section.

Figure 7:
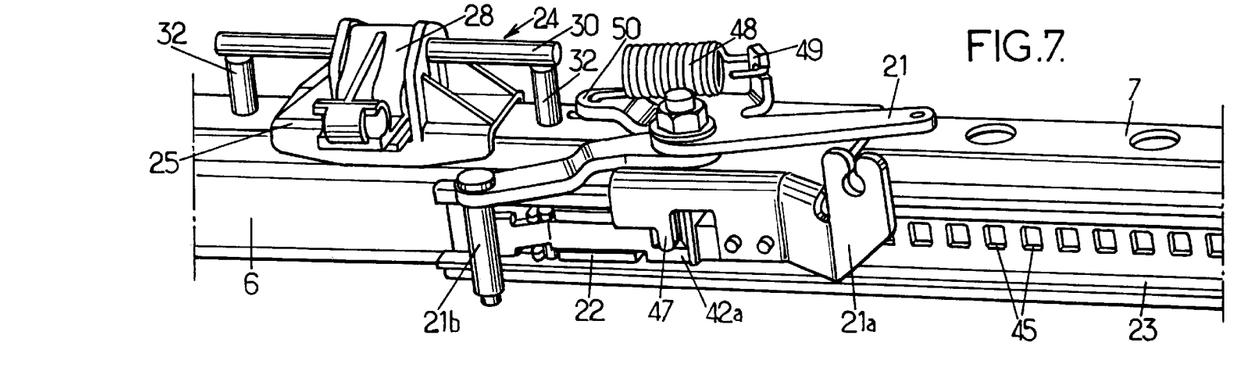
FIG. 7 is a perspective detail view showing a position memory system provided on one of the slides from FIG. 2, shown in an unoperated position.
Figure 8:
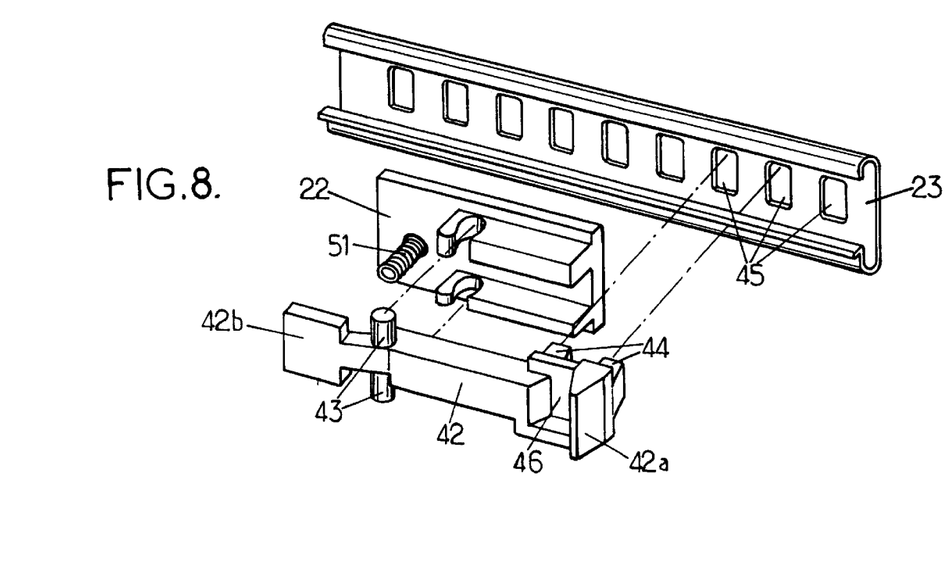
FIG. 8 is an exploded view of part of the memory system from FIG. 7.

Finally, as shown in FIGS. 7 and 8, the memory shoe 22, which is mounted to slide along the rule 23, includes a shoe lock 42 mounted on the memory shoe 22 to pivot about a vertical axis defined by pivot pins 43.

The shoe lock is therefore movable between:

a locked position in which teeth 44 at one end 42a of the shoe lock and oriented toward the rule 23 engage in notches 45 of said rule to immobilized the memory shoe 22, and an unlocked position in which the teeth 44 are disengaged from the notches 45.

The shoe lock 42 can be moved into its unlocked position by a vertical actuator finger 21b on the link 21 which presses on an end 42b of the shoe lock opposite the above-mentioned end 42a when the link 21 is operated by the cable 18.

When this occurs, an opening 46 at the end 42a of the shoe lock and opposite the rule 23 engages over a tooth 47 of the above-mentioned support 21a, which forms a lateral lug partly covering the memory shoe when the seat is in its normal position of use.

When the link 21 is not operated, the link is held in the rest position shown in FIG. 7 by a spring 48 mounted between a lug 49 on the link 21 and a lug 50 on the support 21a.

In this rest position the vertical actuator finger 21b on the link 21 does not bear on the end 42b of the shoe lock and a spring 51 between the memory shoe 22 and said end 42b of the shoe lock (see FIG. 8) holds the shoe lock 42 in its locked position.

The device just described operates as follows.

When a user moves the handle 8 in the direction 9 (FIG. 1), traction is applied to the cable 12a fixed to the third block 17 of the actuator device (FIG. 7), which moves the first and third blocks 15, 17 towards each other, and the third block 17 entrains with it the second block 16, compressing the springs 20.

Thus each of the right-angled ends 14a of the two links 14 is moved towards the corresponding slide 4.

Figure 11:
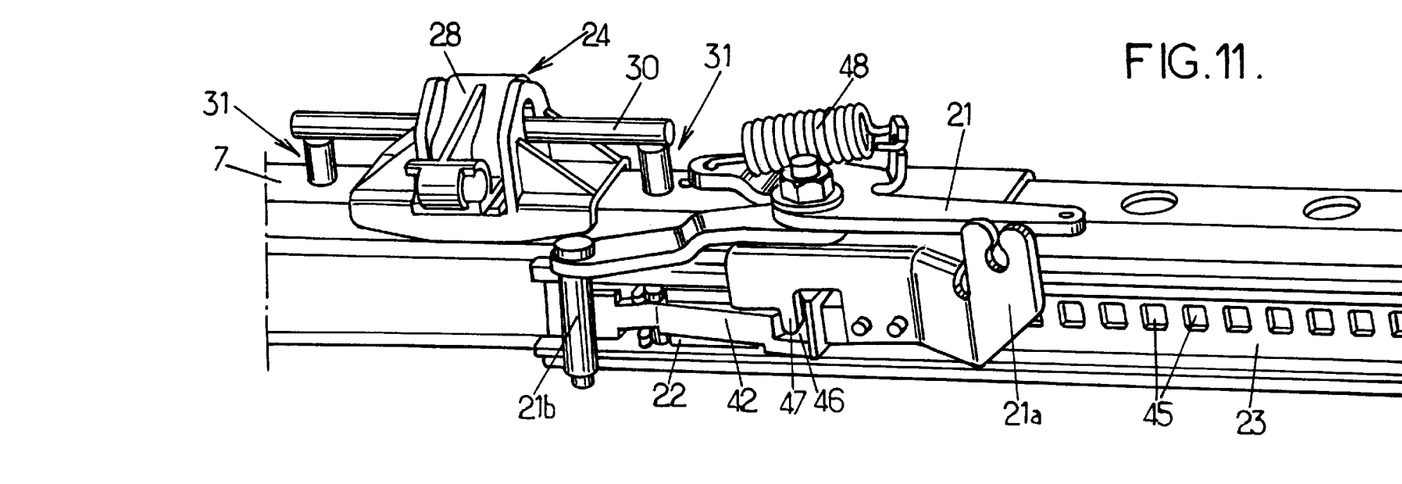
FIG. 11 is a view showing the memory system from FIG. 7 during adjustment of the longitudinal position of the seat.

Because of the movement in opposite directions of the third block 17 and the link 14 attached to the fourth block 19, each through a distance d' greater than d/2 and at most equal to d, the enlarged head 18c of the cable 18a abuts against the fourth block 19, which pulls on the cable 18, operating the link 21, so that the actuator finger 21b on that link unlocks the memory shoe 22, which is entrained by the mobile section 7 of the corresponding slide, the opening 46 in the shoe lock then engaging with the tooth 47 on the support 21a (see FIG. 11).

Figure 9:
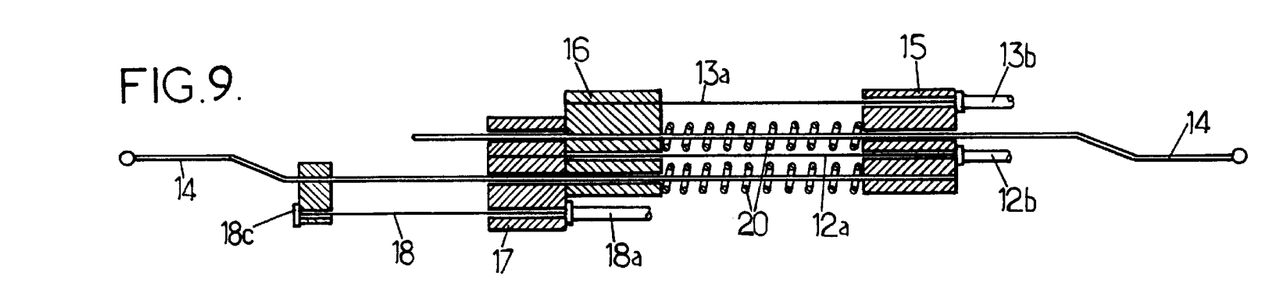
FIG. 9 is a view similar to FIG. 3 showing the position of the actuator device during adjustment of the longitudinal position of the seat.
Figure 10:
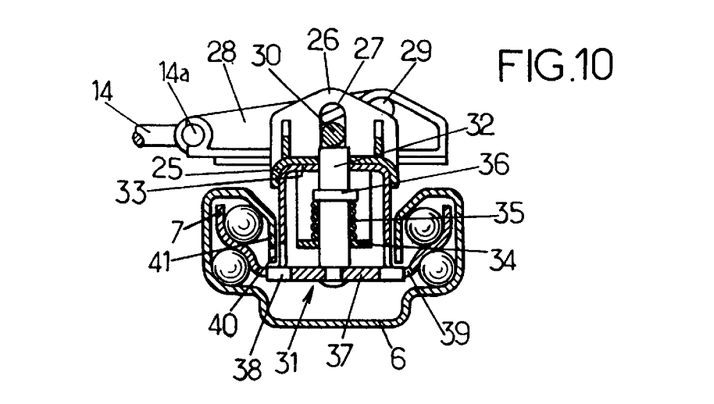
FIG. 10 is a view similar to FIG. 4 showing the slide during adjustment of the longitudinal position of the seat.

The movement of the links 14 moves each slide 28 towards the outside of the seat, to an active position shown in FIG. 9, in which the actuator rod 30 of each slide is in corresponding relationship with the lowest part of the inclined slot 29 of the corresponding slide, with the result that said actuator rod is moved upward and operates on the rods 32 of the locks so that the teeth 39 of said locks are no longer engaged with the teeth 40 of the fixed section of the slide (see FIG. 10).

The mobile sections 7' of the two slides can then slide longitudinally with the seat squab relative to the fixed sections 6.

When the user releases the handle 8, the device reverts to its rest position, the slides are locked and the memory shoe 22 is immobilized on the rule 23.

Figure 12:
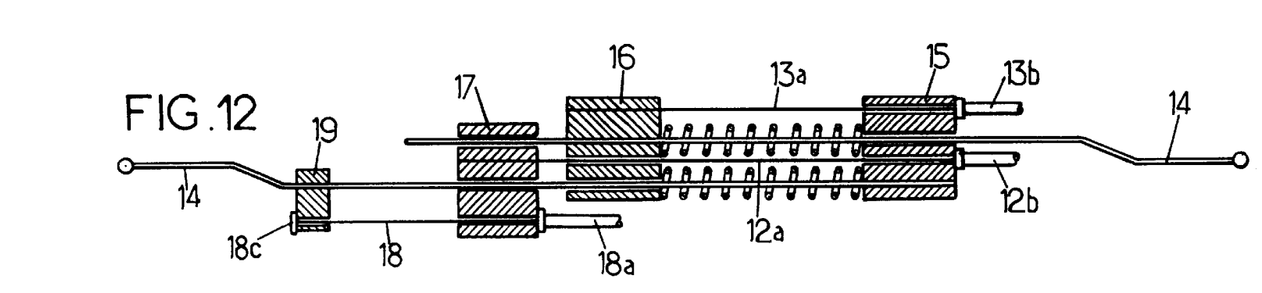
FIG. 12 is a view similar to FIG. 3 showing the actuator device during access to the rear seats of the vehicle.

If the seat back 2 is folded forward by operating the handle 10, the cable 13a operates on the second block 16 of the actuator device to move the first and second blocks 15, 16 towards each other without moving the third block 17 (see FIG. 12).

The two links 14 are therefore pushed outward the distance d', as previously, operating on the slides 28.

During this movement, the fourth block 19 takes up part of the distance d between it and the enlarged head 18c of the cable 18a, but because the third block 17 is immobile the distance d is not taken up completely, or is only just taken up, and no traction is applied to the cable 18a, with the result that the memory shoe 22 remains immobilized on the rule 23.

Figure 13:
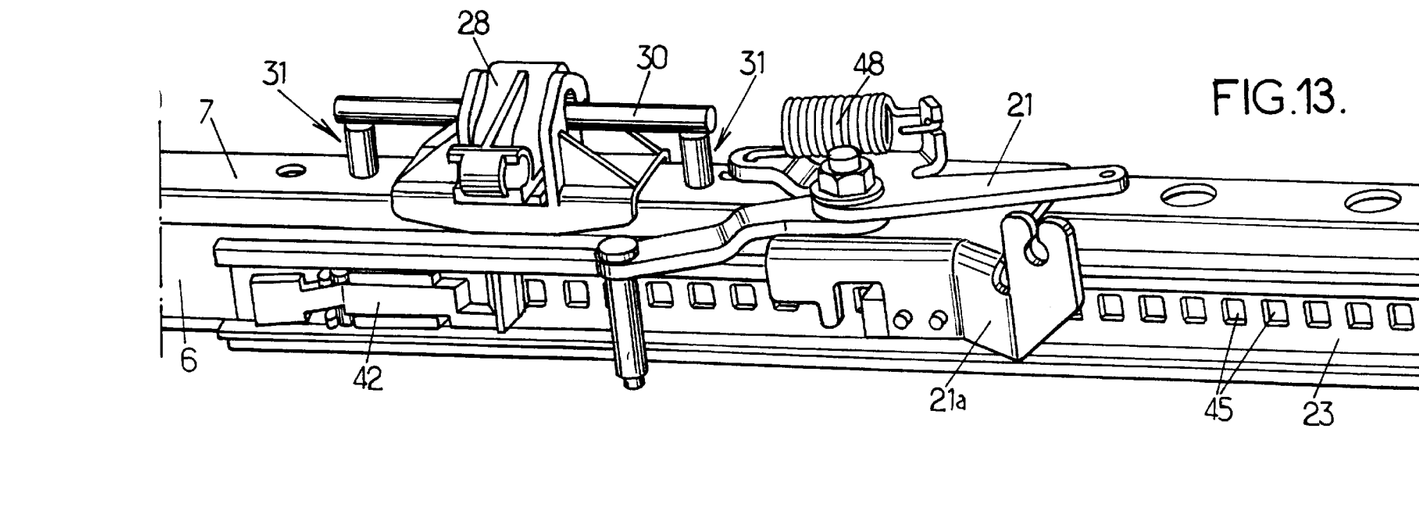
FIG. 13 is a view similar to FIG. 7 showing the position memory system during access to the rear seats of the vehicle.

The slides 4 are then both unlocked in the manner previously explained and the seat squab 3 can be moved (see FIG. 13):

as far forward as possible to enable a user to access the rear seats of the vehicle, and then backward until the mobile section 7 of the slide carrying the memory shoe 22 abuts against the memory shoe, which corresponds to the initial longitudinal position of the seat squab 3.

We claim:

1. A vehicle seat slide including:

a fixed section adapted to be attached to a floor of a vehicle, a mobile section mounted to slide along the fixed section and adapted to be attached to a squab of a seat to enable the squab to move forward and backward in a longitudinal direction, a slide lock mounted on the mobile section and movable between a locked position in which said slide lock engages the fixed section to immobilize the mobile section and an unlocked position in which said slide lock does not engage the fixed section and allows said mobile section to slide, the slide lock being spring-loaded toward the locked position of said slide lock, a memory shoe mounted to slide relative to the fixed section and parallel to the longitudinal direction, the memory shoe defining a memorized position of the mobile section, a shoe fastener device mounted on the mobile section and movable between a coupled position in which said fastener device fastens the memory shoe to the mobile section and a decoupled position in which said fastener device does not fasten the memory shoe to the mobile section, a first actuator device mechanically connected to the slide lock and adapted to place the slide in a first unlocked state in which the slide lock is in the unlocked position of said slide lock and the fastener device is in the coupled position of said fastener device to enable simultaneous sliding of the mobile section and the memory shoe relative to the fixed section in one of a forward and backward direction to adjust the memorized position of the seat, and a second actuator device mechanically connected to the slide lock and adapted to place the slide in a second unlocked state in which the slide lock is in the unlocked position of said slide lock and the fastener device is in the decoupled position of said fastener device to enable the mobile section to slide forward without the memory shoe moving, the memory shoe thereby limiting backward movement of the mobile section, wherein one of the first and second actuator devices further includes a fastener actuator cable system, which is connected to the fastener device to actuate the fastener device, wherein the slide lock does not engage the fastener device, and wherein the memory shoe includes a shoe lock movable between a locked position in which said shoe lock engages the fixed section to immobilize the memory shoe relative to said fixed section and an unlocked position in which said shoe lock does not engage the fixed section but engages the mobile section to fasten the memory shoe to said mobile section, wherein the shoe lock is spring-loaded toward the locked position of said shoe lock, so that said shoe lock is part of the fastener device, and wherein the fastener device further includes an actuator member operated by the fastener actuator cable system, wherein the actuator member of the fastener device engages the shoe lock to move said shoe lock into the unlocked position of said shoe lock on operation of the first actuator device.

2. The slide according to claim 1 wherein the first actuator device includes a first actuator member movable between a rest position and an actuation position, the actuation position corresponding to unlocking of the slide lock, and the second actuator device includes a second actuator member movable parallel to the first actuator member between a rest position and an actuation position, the actuation position corresponding to unlocking of the slide lock, wherein one of the first and second actuator members includes a fastener actuator member, wherein said fastener actuator member is connected to the fastener actuator cable system, and another actuator member is disposed so that movement of the fastener actuator member from the rest position of said fastener actuator member to the actuation position of said fastener actuator member moves said other actuator member from the rest position of said other actuator member to the actuation position of said other actuator member, and movement of said other actuator member from the rest position of said other actuator member to the actuation position of the other actuator member does not move the fastener actuator member.

3. The slide according to claim 2 wherein the fastener device is spring-loaded toward the decoupled position and the fastener actuator cable system is connected to the first actuator member to move the fastener device into the coupled position when said first actuator member is moved from the rest position to the actuation position.

4. The slide according to claim 3 wherein said actuator member of the fastener device includes a lever mounted to pivot on the mobile section about a vertical axis, the lever includes a vertical actuator finger disposed laterally relative to the slide and adapted to act on the shoe lock, and wherein the memory shoe is also disposed laterally relative to the slide.

5. The slide according to claim 4 wherein the mobile section is attached to a lug that covers the memory shoe at least partly when said mobile section is in the memorized position and the lug is shaped to co-operate with at least one part of the shoe lock when said shoe lock is in the unlocked position so that the memory shoe is then fastened to the mobile section.

6. A seat including a seat squab carried by at least one memory slide including:

a fixed section adapted to be attached to a floor of a vehicle, a mobile section mounted to slide along the fixed section and adapted to be attached to the seat squab to enable the squab to move forward and backward in a longitudinal direction, a slide lock mounted on the mobile section and movable between a locked position in which said slide lock engages the fixed section to immobilize the mobile section and an unlocked position in which said slide lock does not engage the fixed section and allows said mobile section to slide, the slide lock being spring-loaded toward the locked position of said slide lock, a memory shoe mounted to slide relative to the fixed section and parallel to the longitudinal direction, the memory shoe defining a memorized position of the mobile section, a shoe fastener device mounted on the mobile section and movable between a coupled position in which said fastener device fastens the memory shoe to the mobile section and a decoupled position in which said fastener device does not fasten the memory shoe to the mobile section, a first actuator device mechanically connected to the slide lock and adapted to place the slide in a first unlocked state in which the slide lock is in the unlocked position of said slide lock and the fastener device is in the coupled position of said fastener device to enable simultaneous sliding of the mobile section and the memory shoe relative to the fixed section in one of a forward and backward direction to adjust the memorized position of the seat, and a second actuator device mechanically connected to the slide lock and adapted to place the slide in a second unlocked state in which the slide lock is in the unlocked position of said slide lock and the fastener device is in the decoupled position of said fastener device to enable the mobile section to slide forward without the memory shoe moving, the memory shoe thereby limiting backward movement of the mobile section, wherein one of the first and second actuator devices further includes a fastener actuator cable system, which is connected to the fastener device to actuate the fastener device, wherein the slide lock does not engage the fastener device, and wherein the memory shoe includes a shoe lock movable between a locked position in which said shoe lock engages the fixed section to immobilize the memory shoe relative to said fixed section and an unlocked position in which said shoe lock does not engage the fixed section but engages the mobile section to fasten the memory shoe to said mobile section, wherein the shoe lock is spring-loaded toward the locked position of said shoe lock, so that said shoe lock is part of the fastener device, and wherein the fastener device further includes an actuator member operated by the fastener actuator cable system, wherein the actuator member of the fastener device engages the shoe lock to move said shoe lock into the unlocked position of said shoe lock on operation of the first actuator device.

7. A seat including a seat squab carried by at least one memory slide including:

a fixed section adapted to be attached to a floor of a vehicle, a mobile section mounted to slide alone the fixed section and adapted to be attached to the seat squab to enable the squab to move forward and backward in a longitudinal direction, a slide lock mounted on the mobile section and movable between a locked position in which said slide lock engages the fixed section to immobilize the mobile section and an unlocked position in which said slide lock does not engage the fixed section and allows said mobile section to slide, the slide lock being spring-loaded toward the locked position of said slide lock, a memory shoe mounted to slide relative to the fixed section and parallel to the longitudinal direction, the memory shoe defining a memorized Position of the mobile section, a shoe fastener device mounted on the mobile section and movable between a coupled position in which said fastener device fastens the memory shoe to the mobile section and a decoupled position in which said fastener device does not fasten the memory shoe to the mobile section, a first actuator device mechanically connected to the slide lock and adapted to place the slide in a first unlocked state in which the slide lock is in the unlocked position of said slide lock and the fastener device is in the coupled position of said fastener device to enable simultaneous sliding of the mobile section and the memory shoe relative to the fixed section in one of a forward and backward direction to adjust the memorized position of the seat, and a second actuator device mechanically connected to the slide lock and adapted to place the slide in a second unlocked state in which the slide lock is in the unlocked position of said slide lock and the fastener device is in the decoupled position of said fastener device to enable the mobile section to slide forward without the memory shoe moving, the memory shoe thereby limiting backward movement of the mobile section, wherein one of the first and second actuator devices further includes a fastener actuator cable system, which is connected to the fastener device to actuate the fastener device, wherein the slide lock does not engage the fastener device, wherein the first actuator device includes a first actuator member movable between a rest position and an actuation position, the actuation position corresponding to unlocking of the slide lock, and the second actuator device includes a second actuator member movable parallel to the first actuator member between a rest position and an actuation position, the actuation position corresponding to unlocking of the slide lock, wherein one of the first and second actuator members includes a fastener actuator member, wherein said fastener actuator member is connected to the fastener actuator cable system, and another actuator member is disposed so that movement of the fastener actuator member from the rest position of said fastener actuator member to the actuation position of said fastener actuator member moves said other actuator member from the rest position of said other actuator member to the actuation position of said other actuator member, and movement of said other actuator member from the rest position of said other actuator member to the actuation position of said other actuator member does not move the fastener actuator member, wherein the fastener device is spring-loaded toward the decoupled position of said fastener device, and the fastener actuator cable system is connected to the first actuator member to move the fastener device into the coupled position of said fastener device when said first actuator member is moved from the rest position of said first actuator member to the actuation position of said first actuator member, wherein the seat squab is further carried by an additional slide including:
- a fixed section extending in said longitudinal direction,
- a mobile section mounted to slide along the fixed section of the additional slide and attached to the seat squab, and
- a slide lock mounted on the mobile section of the additional slide and movable between a locked position in which said slide lock of the additional slide engages the fixed section of the additional slide to immobilize the mobile section of the additional slide and an unlocked position in which said slide lock of the additional slide does not engage the fixed section of the additional slide and allows said mobile section of the additional slide to slide, the slide lock of the additional slide being spring-loaded toward the locked position of said slide lock of the additional slide, wherein each of the slide lock of the memory slide and the slide lock of the additional slide are operated by respective parallel first and second rigid links extending transversely relative to the slides, the first link is attached to the second actuator member and mounted to slide relative to the first actuator member and the second link is mounted to slide relative to the first and second actuator members, wherein the first and second actuator devices comprise respective first and second lock actuator cable systems which each include a flexible outer sheath and a flexible inner cable, the outer sheaths of the first and second lock actuator cable systems are attached to a common rigid block mounted to slide relative to the first link and attached to the second link, the respective inner cables of the first and second lock actuator cable systems are mounted to slide relative to said rigid block, wherein the second actuator member is disposed between the first actuator member and the rigid block, wherein said rigid block is disposed toward the memory slide, and at least one compression spring is disposed between said rigid block and the second actuator member, wherein the fastener actuator cable system includes a flexible outer sheath fixed to the first actuator member and a flexible inner cable which slides in the first actuator member and in a guide attached to the second link, the guide is disposed between the first actuator member and the additional slide, wherein the inner cable of the fastener actuator cable system has a rigid head that is normally situated at a particular non-zero distance d from said guide and between the guide and the additional slide, when the first and second actuator devices are not operated, and wherein the rest and actuation positions of the first actuator member are separated by a distance greater than d/2 and the rest and actuation positions of the second actuator member are separated by a distance at most equal to d.

* * * * *